Feb. 12, 1935.  J. C. REDINGTON  1,990,671
DISPLAY DEVICE
Filed May 23, 1933   2 Sheets-Sheet 1
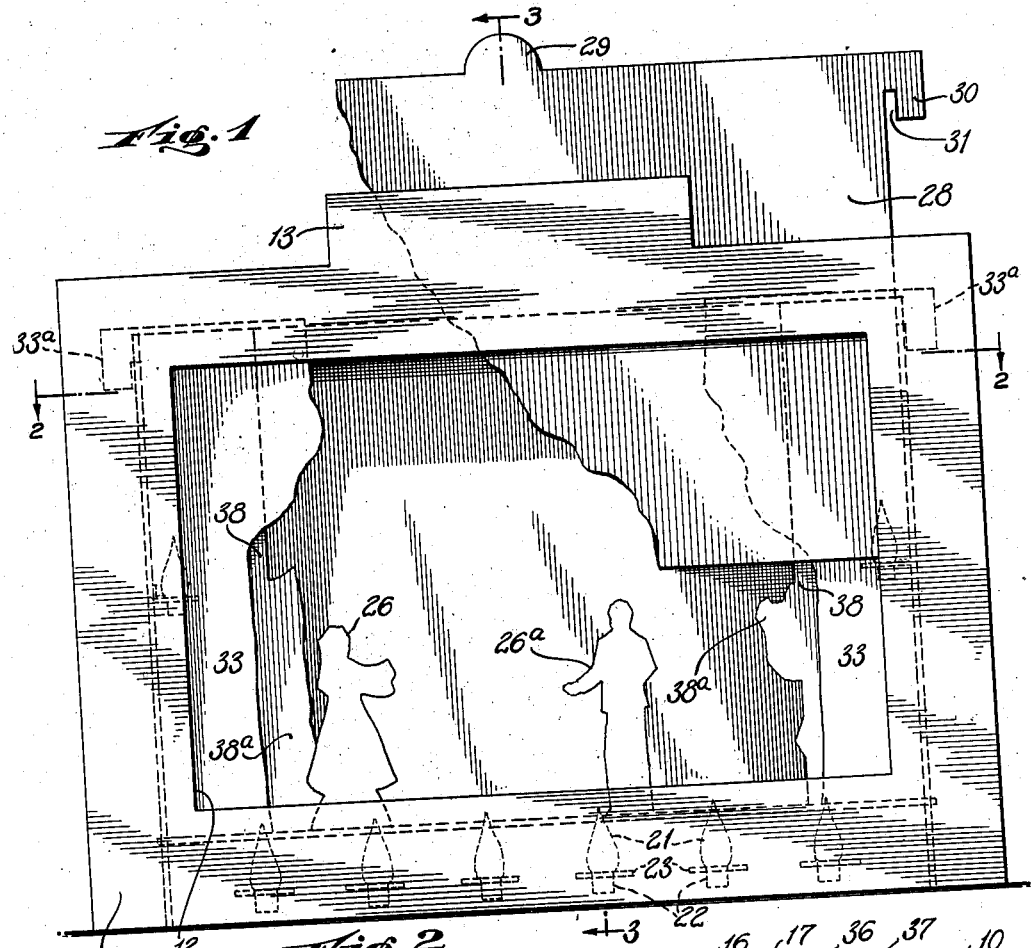
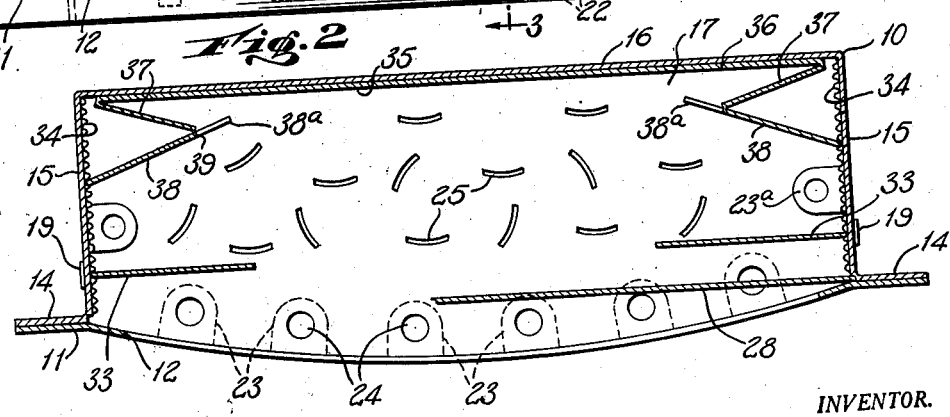
INVENTOR.
JOHN C. REDINGTON
BY
ATTORNEY.

Feb. 12, 1935.  J. C. REDINGTON  1,990,671
DISPLAY DEVICE
Filed May 23, 1933   2 Sheets-Sheet 2
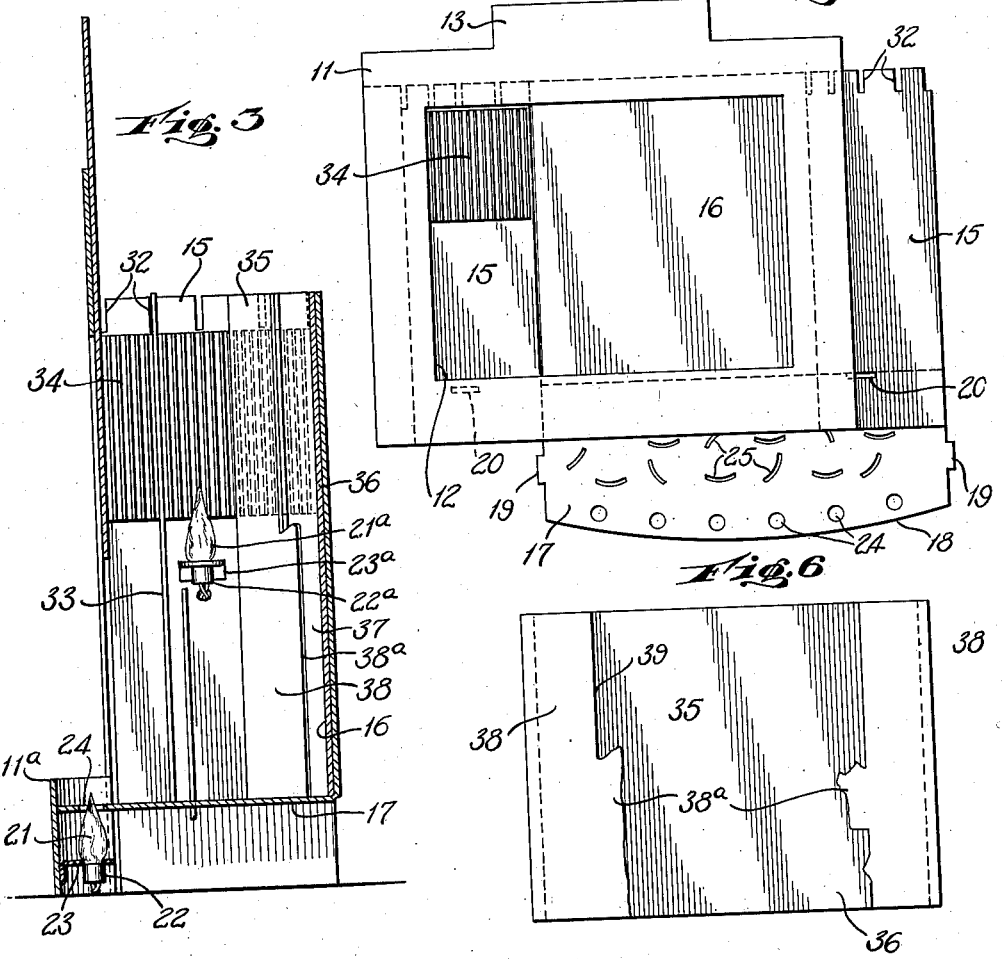
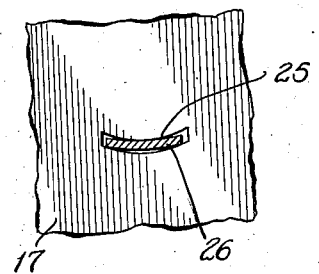
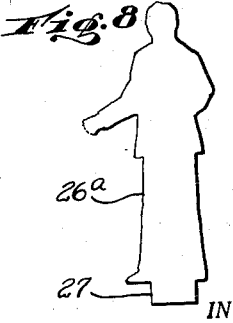
INVENTOR.
JOHN C. REDINGTON
BY
ATTORNEY.

Patented Feb. 12, 1935

1,990,671

UNITED STATES PATENT OFFICE 1,990,671

DISPLAY DEVICE

John C. Redington, Wilton, Conn.

Application May 23, 1933, Serial No. 672,398

13 Claims. (Cl. 40—126)

This invention relates to display devices and particularly to devices of this class involving a display frame or casing consisting of foldable parts in connection with which various display elements are adapted to be mounted to produce through an opening formed in the casing a pleasing display picture or artistic setting conveying a predetermined thought, story, scene or tableaux; and the object of the invention is to provide an apparatus consisting of a casing preferably characterized and shaped to form the representation of a stage or display medium; a further object being to provide the casing with a screen or closure element movably supported in connection with the casing to control vision of the elements displayed therein; a further object being to provide means for illuminating the stage or chamber of the casing to provide pleasing effects and to more distinctly offset the characters placed on display within the stage or casing; a further object being to provide a simple means of supporting figures, characters or display elements on the bottom or floor of the casing stage in such manner as to retain the same in upright position and prevent accidental displacement thereof; a further object being to provide means on opposed side walls of the casing for detachably and adjustably supporting scene elements within and to the casing in the production of various scene effects; a still further object being to provide a device of the class described which is constructed from sheet material to permit the compact folding or collapsing of the casing as well as the display parts used in conjunction therewith, and particularly in the use of sheet display characters which are in the form of silhouettes; and with these and other objects in view, the invention consists in a display device or apparatus of the class described, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 1 is a front view of a device made according to my invention with parts of the construction broken away.

Fig. 2 is a section on the line 2—2 of Fig. 1, with parts of the structure removed.

Fig. 3 is a section on the line 3—3 of Fig. 1.

Fig. 4 is a plan and sectional detail view showing the method of frictionally supporting display characters in connection with the device.

Fig. 5 is a plan view of a part of the device shown in Figs. 1 to 3 inclusive, collapsed for shipment or transportation.

Fig. 6 is a face view of a scene element illustrated in Figs. 1 to 3 inclusive, detached; and, Figs. 7 and 8 are face views of two different display characters or elements which I employ.

For the purpose of illustrating one of the many methods of carrying my invention into effect, I have shown in the accompanying drawings the reproduction of a stage setting within the stage of which are adapted to be arranged scenes, scene elements, figures, characters or objects, whereby a particular scene from a story, play or other dramatic production may be reproduced to provide an entertaining, educational as well as pleasing effect when viewed through the stage opening. With this thought in mind, it will be understood that numerous scene elements may be provided to permit the changing of scenes or the production of different scene settings as well as numerous figures, characters or objects to complete the reproduction of a complete story or play by consecutive arrangements of scenes from said scene and character elements. It will thus be apparent that an apparatus of this class may be merchandised to place in the home, a means for reproducing predetermined stories, plays, operas or other dramatizations which will be amusing as well as educational and entertaining.

However, it will also be understood that the apparatus may be utilized as an advertising medium to display in a window or on a counter or any other predetermined place, predetermined merchandise offered for sale by the use in the setting or casing of display elements or characters consistent with the merchandise displayed or kindered to the advertising matter utilized in conjunction therewith.

For example, a manufacturer using certain artists in its advertising matter or through the medium of radio broadcasts, could reproduce these artists or its current weekly or daily studio scenes in the display, to keep the public in constant touch with the merchandise advertised or displayed, and the apparatus may also be used in what might be termed fixed advertising display material. For example, a paint concern might utilize and display with a predetermined background, scene elements representing colors of paints, and arranging said elements at opposite side walls of the casing and visible through the casing or stage opening.

It will also be understood that while the stage or casing of the apparatus as well as the several display elements are preferably composed of printed, lithographed or otherwise formed sheets of cardboard, heavy paper or like fibrous material, the same may be constructed from sheet metal, colored and characterized in the known manners.

The invention as disclosed in the accompanying drawings is in the representation of a stage setting, and in the drawings 10 represents a cassetting, and stage formed from a front frame element 11 having a large stage opening 12 therein and with a projecting top portion 13 of any desired contour. Attached to the sides of the frame 11 as seen at 14 is a sheet from which the side walls 15, back wall 16 and bottom wall 17 of the casing or stage are formed, these walls being all foldable with respect to each other to permit the compact folding or collapsing of the device into the position shown in Fig. 5 of the drawings for mailing, packing or other transportation of the device. It will be noted that the forward edge 18 of the bottom wall 17 is curved or arc-shaped in form so that when the bottom wall is placed in position, the lower member of the frame 11 is sprung outwardly to produce the arc-shaped foot-light rail 11a of the stage setting as clearly indicated in Figs. 2 and 3 of the drawings, and at the same time serving to frictionally support the bottom 17 in position, the ends of the bottom wall 17 having projecting lugs 19 which pass through apertures 20 in the side walls 15 to key the wall 17 in horizontal position. It will also be noted that the bottom wall 17 is disposed above the lower edges of the side walls 15 and the part 11a of the frame 11 so as to provide supporting lugs for the casing or stage. This also provides a space below the bottom wall 17 in which may be arranged suitable means of illumination.

In the construction shown, a plurality of electric bulbs 21 and their sockets 22 are supported in foldable brackets 23 arranged on the inner surface of the part 11a of the frame 11 and beneath and adjacent light openings 24 in the bottom wall 17 so as to produce the footlight illuminating effects desirable in a display or stage setting of the class under consideration. Similar brackets 23a may also be arranged on the inner surface of the walls 15 to support bulbs 21a and their sockets 22a for illuminating the sides of the stage or display setting. In this connection, by using eight bulbs, a common Christmas tree lighting circuit may be employed for the illuminating effect. However, the type of lights or lighting effect employed may be varied to suit the size, style and type of display apparatus used.

The bottom wall 17 is provided with a series of arc-shaped apertures 25 preferably arranged in different angular positions with respect to each other and in different positions over the surface of said wall which constitutes a stage platform so that numerous characters, figures or objects may be arranged and supported thereon in different relationship with respect to each other, and it will be understood that these openings or cut outs may have different arrangements in the production of different stage settings to adapt them for the production of predetermined displays and the characters or other elements used in the display.

At 26 and 26a I have shown silhouetted character elements, the element 26 representing a girl or woman and the element 26a a boy or man, and each of these elements includes at the lower end thereof a projecting tongue 27 adapted to be passed through the arc-shaped apertures 25, and by reason of the fact that the tongues are straight, they are frictionally passed into the apertures 25 and serve to support the elements 26, 26a in upright position and also against accidental displacement from the floor 17. At this time, it will be understood that if a relatively large element 26, 26a is employed, two or more of the projecting tongues 27 may be arranged thereon to engage correspondingly spaced apertures 25.

In certain uses of my invention, for example, in the reproductions of plays, the cut out or silhouetted figures, characters or other display elements may be die cut or otherwise formed from a sheet of heavy paper, cardboard or the like and removed therefrom in the production of various stage or scene settings. In this way, it will be understood that by purchasing or otherwise acquiring the equipment involving the scene figures and character elements of different plays, stories or other dramatizations, the same may be reproduced in a single stage involving the casing 10 and the several parts thereof, or if desired, each play or the like may have supplied with it a special stage structure and this is especially true when the device and the several parts thereof are composed of printed or lithographed cardboard or like material.

At this time, it will also be understood that in the production of advertising displays, the figures or characters will be produced in accordance with conventional methods and not necessarily be involved in a sheet or card from which they are removed by a user. In conjunction with the casing or stage are employed other scene elements, for example, a curtain 28 which is movable vertically with respect to and arranged immediately adjacent the opening 12 in the frame 11 and can be raised and lowered by means of a finger piece 29 thereon, the upper corner portions of the curtain 28 having hook-shaped projections 30, the recesses 31 of which are adapted to pass through corresponding recesses 32 in the upper end of the side walls 15 of the casing. Each side wall has a plurality of the recesses or notches 32 to receive other scene elements 33 disposed at opposite sides of the stage and including projections 33a similar to the projections 30, note Fig. 1 of the drawings. On the inner face of each side wall 15 adjacent the upper end thereof is arranged a strip or sheet of corrugated paper or other material 34 which aids in supporting the scene elements 33 and also serves to adjustably support other scene elements 35, the element 35 in the construction shown consisting of a back wall 36 having foldable side wings 37 and 38, the ends of the latter being adjustably supported in the corrugated sheets 34 as clearly illustrated in Fig. 2 of the drawings, and also include portions 38a which are cut from the material of the wings 34 and project beyond the folded corners or edges 39. It will be understood that the scene elements 33 to 35 may be of any desired contour and characterized by lithographing, printing or otherwise to produce a predetermined scene. In this connection, it will be understood that the curtain 28 will also be preferably characterized to represent a curtain. All of these features of characterization are eliminated from the accompanying drawings, solely for the purpose of simplification and to avoid confusion. It will also be understood that by providing the corrugated sheets 34, a very simple and yet effective method is provided for adjusting the various scene elements and for adjusting and supporting the side wings of such elements to produce in the resulting reproduction very pleasing, attractive as well as natural effects.

It will be understood that while I have shown a casing or stage of specific structure, that my invention is not limited in this respect, nor am I limited to the use of the lighting effect disclosed, nor to any particular type of stage illumination, and various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. A device of the class described comprising a stage body, a display element adapted to be supported in said body, means on said body and element for supporting the same in predetermined position and against accidental displacement, means for detachably and adjustably supporting scene elements in connection with said stage body, said body having a front stage opening and a curtain movably supported in the body adjacent said opening controlling vision of the stage and the display and scene elements thereon, said stage body comprising a frame including foldable side, back and bottom wall members, and the bottom wall member having a curved outer edge adapted to flex the adjacent lower portion of said frame outwardly in extending the wall members to form the stage body.

2. A device of the class described comprising a stage body, a display element adapted to be supported in said body, means on said body and element for supporting the same in predetermined position and against accidental displacement, means for detachably and adjustably supporting scene elements in connection with said stage body, said body having a front stage opening and a curtain movably supported in the body adjacent said opening controlling vision of the stage and the display and scene elements thereon, said stage body comprising a frame including foldable side, back and bottom wall members, the bottom wall member having a curved outer edge adapted to flex the adjacent lower portion of said frame outwardly in extending the wall members to form the stage body, the bottom wall member having a plurality of openings spaced longitudinally of the curved edge thereof, and illuminating means supported in the body for transmitting light through said openings.

3. A device of the class described comprising a stage body, a display element adapted to be supported in said body, means on said body and element for supporting the same in predetermined position and against accidental displacement, means for detachably and adjustably supporting scene elements in connection with said stage body, said body having a front stage opening and a curtain movably supported in the body adjacent said opening controlling vision of the stage and the display and scene elements thereon, said stage body comprising a frame including foldable side, back and bottom wall members, the bottom wall member having a curved outer edge adapted to flex the adjacent lower portion of said frame outwardly in extending the wall members to form the stage body, the bottom wall member having a plurality of openings spaced longitudinally of the curved edge thereof, and illuminating means supported in the body for transmitting light through said openings, and other means for illuminating the stage at the side walls thereof.

4. A device of the class described comprising a stage body, a display element adapted to be supported in said body, means on said body and element for supporting the same in predetermined position and against accidental displacement, said means including an arc-shaped opening in the floor of said stage body and a projecting tongue on said element of a width substantially equal to the length of said opening and frictionally engaging the walls of said opening to retain said element in position, the floor of said stage body having a plurality of said openings arranged over the surface thereof and in different angular relations with respect to each other whereby a plurality of display elements may be supported on the stage floor in different angular relations with respect to each other, means spaced longitudinally at the front of the stage floor for illuminating the stage body and the elements disposed thereon, the stage body including side and back walls and a front wall having a stage opening and a curtain slidably engaging the side walls of the stage body adjacent the front wall to control the opening in said front wall, the side walls of the stage body having on the inner surfaces thereof and adjacent the upper ends only thereof, strips of corrugated material forming a plurality of vertical guide channels, and scene members adjustably supported within the stage body and engaging said channels to retain the same in different positions of adjustment.

5. A device of the class described comprising a stage body, a display element adapted to be supported in said body, means on said body and element for supporting the same in predetermined position and against accidental displacement, said means including an arc-shaped opening in the floor of said stage body and a projecting tongue on said element of a width substantially equal to the length of said opening and frictionally engaging the walls of said opening to retain said element in position, the floor of said stage body having a plurality of said openings arranged over the surface thereof and in different angular relations with respect to each other whereby a plurality of display elements may be supported on the stage floor in different angular relations with respect to each other, means spaced longitudinally at the front of the stage floor for illuminating the stage body and the elements disposed thereon, the stage body including side and back walls and a front wall having a stage opening and a curtain slidably engaging the side walls of the stage body adjacent the front wall to control the opening in said front wall, the side walls of the stage body having on the inner surfaces thereof and adjacent the upper ends only thereof, strips of corrugated material forming a plurality of vertical guide channels, scene members adjustably supported within the stage body and engaging said channels to retain the same in different positions of adjustment, and one of said scene elements including relatively foldable display parts.

6. A device of the class described comprising a stage body consisting of two attached sheet parts, one part having a large opening bounded by top, bottom and side walls, the other part being folded to form back, side and bottom walls. the ends of the side walls of the second named part being attached to the first part to form a collapsible unit of the entire stage body, the bottom wall of the second named part being foldable with respect to the lower edge of the back wall thereof and being arranged adjacent the lower edge of the stage opening formed in the first named part and forming the floor of said stage opening when said parts are extended for use, a plurality of vertically extending and longitudinally spaced channels at the upper ends only of the inner surfaces of the side walls of said second named part, and scene members adapted to be adjustably arranged in the stage opening and engaging predetermined channels to retain the same in different positions of adjustment.

7. A device of the class described comprising a stage body consisting of two attached sheet parts, one part having a large opening bounded by top, bottom and side walls, the other part being folded to form back, side and bottom walls, the ends of the side walls of the second named part being attached to the first part to form a collapsible unit of the entire stage body, the bottom wall of the second named part being foldable with respect to the lower edge of the back wall thereof and being arranged adjacent the lower edge of the stage opening formed in the first named part and forming the floor of said stage opening when said parts are extended for use, a plurality of vertically extending and longitudinally spaced channels at the upper ends only of the inner surfaces of the side walls of said second named part, scene members adapted to be adjustably arranged in the stage opening and engaging predetermined channels to retain the same in different positions of adjustment, and means on the floor of the stage body whereby a plurality of scene characters may be supported in different angular relationship with respect to each other.

8. A device of the class described comprising a stage body consisting of two attached sheet parts, one part having a large opening bounded by top, bottom and side walls, the other part being folded to form back, side and bottom walls, the ends of the side walls of the second named part being attached to the first part to form a collapsible unit of the entire stage body, the bottom wall of the second named part being foldable with respect to the lower edge of the back wall thereof and being arranged adjacent the lower edge of the stage opening formed in the first named part and forming the floor of said stage opening when said parts are extended for use, a plurality of vertically extending and longitudinally spaced channels at the upper ends only of the inner surfaces of the side walls of said second named part, scene members adapted to be adjustably arranged in the stage opening and engaging predetermined channels to retain the same in different positions of adjustment, and means on the floor of the stage body whereby a plurality of scene characters may be supported in different angular relationship with respect to each other, said last named means including relatively thin and slightly curved apertures.

9. A device of the class described comprising a stage body consisting of two attached sheet parts, one part having a large opening bounded by top, bottom and side walls, the other part being folded to form back, side and bottom walls, the ends of the side walls of the second named part being attached to the first part to form a collapsible unit of the entire stage body, the bottom wall of the second named part being attached to the first part to form a collapsible unit of the entire stage body, the bottom wall of the second named part being foldable with respect to the lower edge of the back wall thereof and being arranged adjacent the lower edge of the stage opening formed in the first named part and forming the floor of said stage opening when said parts are extended for use, the lower ends of the side walls of the second named part being in alinement with the lower edge of the first named part to support said parts on a table or other surface when extended for use, and the forward edge of the stage floor being curved outwardly and adapted to flex the lower portion of the first named part outwardly in a curved contour.

10. A device of the class described comprising a stage body consisting of a back wall, a bottom wall and side walls foldable with respect to the back wall, the bottom wall when extended for use being attached to the side walls and arranged above the lower ends of said side walls, and a sheet having a large central opening therein attached to the forward ends of the side walls and forming a stage frame bordering the top, bottom and sides of the stage opening formed between the back, bottom and side walls of said body.

11. A device of the class described comprising a stage body consisting of a back wall, a bottom wall and side walls foldable with respect to the back wall, the bottom wall when extended for use being attached to the side walls and arranged above the lower ends of said side walls, a sheet having a large central opening therein attached to the forward ends of the side walls and forming a stage frame bordering the top, bottom and sides of the stage opening formed between the back, bottom and side walls of said body, and the lower part of said frame being in alinement with the lower ends of the side walls and closing the space below the bottom wall or floor of said stage body.

12. A device of the class described comprising a stage body, a flat, strip-like display element adapted to be supported on said body, means on the body and element for supporting said element against accidental displacement from said body, said means comprising an arc-shaped opening in the floor of said stage body and a projecting tongue centrally of the lower end of said element of a width substantially equal to the length of said opening and frictionally engaging the walls of said opening to retain said element in upright position on the stage floor, and the element having a portion adjacent the tongue engaging the stage floor to limit movement of the tongue into the opening of the floor, and the floor of said stage body having a plurality of said openings arranged over the surface thereof and in different angular relations with respect to each other whereby a plurality of display elements may be supported on the stage floor in different angular relations with respect to each other.

13. A device of the class described comprising a stage body, a flat, strip-like display element adapted to be supported on said body, means on the body and element for supporting said element against accidental displacement from said body, said means comprising an arc-shaped opening in the floor of said stage body and a projecting tongue centrally of the lower end of said element of a width substantially equal to the length of said opening and frictionally engaging the walls of said opening to retain said element in upright position on the stage floor, the element having a portion adjacent the tongue engaging the stage floor to limit movement of the tongue into the opening of the floor, the floor of said stage body having a plurality of said openings arranged over the surface thereof and in different angular relations with respect to each other whereby a plurality of display elements may be supported on the stage floor in different angular relations with respect to each other, and means spaced longitudinally at the front of the stage floor for illuminating the stage body and the elements disposed thereon.

JOHN C. REDINGTON.